(12) United States Patent
Roberson et al.

(10) Patent No.: US 11,995,132 B2
(45) Date of Patent: May 28, 2024

(54) SYSTEMS AND METHODS FOR VISUALIZING POSTING DATA AND FACILITATING POSTING COMMUNICATIONS

(71) Applicant: STATE FARM MUTUAL AUTOMOBILE INSURANCE COMPANY, Bloomington, IL (US)

(72) Inventors: Daniel Roberson, Mahomet, IL (US); Adam Joseph Ariola, Bloomington, IL (US); Connor Brooks, Bloomington, IL (US); Steven Stiles, Sandy Springs, GA (US); Kristopher Keith Gaudin, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 38 days.

(21) Appl. No.: 17/515,849

(22) Filed: Nov. 1, 2021

(65) Prior Publication Data
US 2022/0050880 A1 Feb. 17, 2022

Related U.S. Application Data (63) Continuation of application No. 15/713,212, filed on Sep. 22, 2017, now Pat. No. 11,222,079.

(51) Int. Cl.
| | | |
|---|---|---|
| G06F 16/20 | (2019.01) | |
| G06F 16/27 | (2019.01) | |
| G06F 16/904 | (2019.01) | |
| G06F 16/907 | (2019.01) | |
| G06F 16/93 | (2019.01) | |
| G06F 17/40 | (2006.01) | |

(52) U.S. Cl.
CPC .............. *G06F 16/93* (2019.01); *G06F 16/27* (2019.01); *G06F 16/904* (2019.01); *G06F 16/907* (2019.01); *G06F 17/40* (2013.01)

(58) Field of Classification Search
None
See application file for complete search history.

(56) References Cited

U.S. PATENT DOCUMENTS

8,560,605 B1 * 10/2013 Gyongyi ................. G06F 16/95
                                                            709/204
8,924,465 B1    12/2014 Tunguz-Zawislak
(Continued)

*Primary Examiner* — Jau Shya Meng
(74) *Attorney, Agent, or Firm* — MARSHALL, GERSTEIN & BORUN LLP (57) ABSTRACT

A system is described for generating a graphical representation of a mapping of post data of a posting. In various aspects, post data may be collected which may include a first node of a plurality of nodes identifying a submitting user of the one or more document management systems. Reaction data may be collected which may include a second node of the plurality of nodes identifying a reacting user of the one or more document management systems. The mapping may then be generated from the post data and the reaction data, in which the mapping may include the first node and the second node. The graphical representation of the mapping may then be generated, wherein zooming out of the graphical representation may filter out one or more nodes of the plurality of nodes based on a number of edges corresponding to the one or more nodes.

20 Claims, 7 Drawing Sheets

(56) References Cited

U.S. PATENT DOCUMENTS

| | | | |
|---|---|---|---|
| 8,938,690 B1 * | 1/2015 | Khouri | G06Q 50/01 |
| | | | 715/753 |
| 8,996,625 B1 | 3/2015 | Singleton et al. | |
| 10,050,849 B1 * | 8/2018 | Long | G06F 40/14 |
| 2002/0059342 A1 | 5/2002 | Gupta et al. | |
| 2004/0153509 A1 | 8/2004 | Alcorn et al. | |
| 2011/0040787 A1 | 2/2011 | Cierniak et al. | |
| 2011/0271230 A1 * | 11/2011 | Harris | G06F 3/0482 |
| | | | 715/810 |
| 2012/0005224 A1 | 1/2012 | Ahrens et al. | |
| 2012/0266081 A1 | 10/2012 | Kao | |
| 2013/0024879 A1 | 1/2013 | Bruich et al. | |
| 2014/0006503 A1 * | 1/2014 | Serafini | G06F 16/958 |
| | | | 709/204 |
| 2014/0019240 A1 | 1/2014 | Zhou | |
| 2015/0026260 A1 * | 1/2015 | Worthley | G06F 16/958 |
| | | | 709/204 |
| 2015/0142767 A1 * | 5/2015 | Wu | G06F 16/951 |
| | | | 707/706 |
| 2015/0310128 A1 | 10/2015 | Brav et al. | |
| 2015/0350259 A1 | 12/2015 | Garg et al. | |
| 2015/0379528 A1 | 12/2015 | Gupta et al. | |
| 2018/0081885 A1 * | 3/2018 | Glueck | G06Q 10/103 |
| 2018/0349002 A1 * | 12/2018 | Kindelsberger | G06F 16/9024 |

* cited by examiner

Post Data — 500

| ID | DMS | Blog | Owner | Title | Post text | Category Type | Date |
|---|---|---|---|---|---|---|---|
| ... | ... | ... | ... | ... | ... | ... | ... |
| 267 | Ask Smith | "Mark Smith's Intranet Blog!" | Mark Smith | "Results from Q2 Phishing are Out and Not Great" | "Second Quarter results show that..." | 1 | 08/01/2016 |
| ... | ... | ... | ... | ... | ... | ... | ... |

FIG. 5A

Reaction Data — 510

| ID | Type | Post | User | Text | Date |
|---|---|---|---|---|---|
| ... | ... | ... | ... | ... | ... |
| 53 | Comment | 267 | Matt Galt | "That's not good..." | 08/01/2016 |
| 54 | Like | 267 | Matt Galt | N/A | ... |

FIG. 5B

Tabular Mapping — 530

| ID | DMS | Node | Edge | Reactions | Reaction Frequency | Category 1 Frequency | Category 2 Frequency | ... |
|---|---|---|---|---|---|---|---|---|
| ... | ... | ... | ... | ... | ... | ... | ... | ... |
| 13 | Ask Smith | Mark Smith | Matt Galt | 38 | 65% | 45% | 15% | ... |
| 14 | Ask Smith | Mark Smith | User A | 12 | 15% | 29% | 61% | |
| 15 | DMS A | Mark Smith | User D | 23 | 25% | 14% | 35% | |
| ... | ... | ... | ... | ... | ... | ... | ... | |

SYSTEMS AND METHODS FOR VISUALIZING POSTING DATA AND FACILITATING POSTING COMMUNICATIONS

CROSS REFERENCE TO RELATED APPLICATION

The present application is a continuation of U.S. patent application Ser. No. 15/713,212, entitled Systems and Methods for Visualizing Posting Data and Facilitating Posting Communications, filed Sep. 22, 2017, the disclosure of is incorporated herein by reference in its entirety.

FIELD OF THE DISCLOSURE

The present disclosure generally relates to systems and methods for improving document management systems or related systems, including improving document management systems or related systems for visualizing posting data and facilitating posting communications.

BACKGROUND

Companies typically employ computerized systems, known as document management systems, to store, retrieve and otherwise manage their respective electronic documents, files, posts, weblogs ("blogs"), and/or other data created by, used by, or otherwise received by their employees, agents, customers, or other users. Each of the stored documents typically contain data, such as text, image, or other data, such as associated metadata, which can include the file size of the document, its number of pages, etc. The document management system may itself store data or metadata associated with the documents, such as the authors of the documents, timestamps indicating when the documents were first created or were last accessed by users of the system, the number of documents on the system, or the number and types of reactions to the documents, such as comments from other users of the document management system, etc.

At large companies, for example, such document management systems can experience the addition of thousands of new documents a day. Overtime, such document management systems can grow to contain tens of thousands, hundreds of thousands, or even millions of documents, files, blog postings, images, and related data and metadata created by or otherwise stored or associated with its users. The users may include distributed users at different physical locations, such as users at a company's headquarters, users at the same company's satellite or remote offices, and/or users working at locations outside of the company's offices on a remote communication link, each accessing and contributing to the document management system.

As the document management system and its related documents and data grows, a problem arises because, without user diligence, which is typically rare, of categorizing, organizing or otherwise associating documents or groupings of documents within the system, the document management system typically becomes an unwieldy set of unrelated documents, files, information, and/or other data which in contrary to the intended purpose of the document management system in the first instance. For example, the disorganization and disassociation of the company's documents and data becomes difficult for the company to manage or put to use for business purposes. For example, such disassociation may cause a company to lose value from a failure to recognize trends or patterns that could otherwise assist with a company's business decisions, communications or internal processes.

Conventional data retrieval methods are typically inadequate to deal with the vast quantities of documents and data of today's document management systems. For example, typical graphical user interface (GUI) user tools provided with document management systems for retrieving documents are generally limited to Boolean search functionality (e.g., "and" and "or" searches) that encourage trial-and-error and manual manipulation of the GUI to retrieve categorical information. Such techniques have proven inadequate to manipulate or associate the large body of documents, files, posts, and other data that is typical of today's companies' document management systems.

BRIEF SUMMARY

For the foregoing reasons, there is a need for improvements in the capabilities of existing document management systems through, for example, computerized systems and methods to build mappings, associations, or relationships among the various documents, posts, files, and/or data of a given company's document management system(s). Such improvements can be used to provide, for example, a company with insight and analysis into a potential wealth of data to allow for the company to make informed business decisions, or to facilitate internal or external communications or advertising using the documents or files, e.g., by identifying areas lacking documents and encouraging internal communications and document creation among the company's employees.

Other useful benefits include, for example, promoting system users to make document contributions to the system (e.g., where it is determined that such users rarely make any such contributions); identifying documents by authors or posters determined to be influential within a company or among customers, and, for example, publish documents or postings through those authors or posters; identifying areas of the system where additional information may be needed and, for example, generate a survey to collection such information; identifying a need further actions needed (e.g., need for more employee training for phishing related email scams); or generating a graphical representation or visualization of the mapped interconnectedness of the documents, files or posts within the document management system to facilitate a visualization of the data for use with any of the above or other beneficial uses.

Accordingly, systems and methods are described for generating a graphical representation of a mapping of post data of a posting. In various aspects, post data may be collected. The post data may include a first node of a plurality of nodes identifying a submitting user of the one or more document management systems that submitted the posting to the one or more document management systems. Reaction data may be collected. The reaction data may be associated with the posting and may further include a second node of the plurality of nodes identifying a reacting user of the one or more document management systems that reacted to the posting. The mapping may then be generated from the post data and the reaction data, in which the mapping may include the first node of the plurality of nodes and the second node of the plurality of nodes. The graphical representation of the mapping may then be generated, wherein zooming out of the graphical representation may filter out one or more nodes of the plurality of nodes based on a number of edges corresponding to the one or more nodes.

In other aspects, the mapping may cause the document management system to send an electronic survey to one or more users of the various document management systems where the document management system determines that additional information or documents are needed (e.g., for particular types or categories of information or documents in the document management systems determined to have low or insufficient representation or quantities). In another aspect, the document management system may store the mapping in a remote database. The mapping may also identify one or more categories (e.g., "Announcements" or "Events") associated with a posting.

In another aspect, the mapping may further include a third node of the plurality of nodes associated with an influential user of the one or more document management systems, the influential user having two or more edges, and wherein at least one of the one or more document management systems pushes a communication of the influential user to other users associated with the company.

In another aspect, one or more nodes of the plurality of nodes of the graphical representation of the mapping may have a node size based on a number of edges corresponding to the one or more nodes.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

The present embodiments relate to, inter alia, document management systems and their related documents, files, and other data. In certain embodiments, document management systems may be used to host, distribute or otherwise facilitate user web blogs (known as "blogs") where, for example, a company's users can submit online documents (known, for example, as "posts" or "postings"). The blog can be a general blog where any user can submit a posting or the blog can be particular to a specific user, for example, an owner of a blog where only the blog owner can submit postings. Both types of blogs typically allow for the collection of additional documents and data from other users who interact with the blog. For example, other users may interact with a blog by adding comments to a blog posting or otherwise react to the post by indicating that they "like" the post or by sharing the post. Where the blog is general, other users may interact with the blog by making their own postings for additional users to interact with. All of these document posts, related data, metadata, and other information, as described herein, are stored in the document management system for distribution to the users of the system.

In various aspects, the document management system may be improved by generating a mapping of the new information and configuring the document management system with the mapping. The mapping may then be used by the system's users, such as a company's employees or agents, to take advantage of the organized, mapped data, which typically includes new data or information that may be used to benefit the company's communications or business purposes as described herein.

Document management systems can vary widely in size, use and configuration from company to company. Accordingly, while FIG. 1 illustrates an example networked system overview of various systems and devices, including a document management system, in accordance with an aspect of the present disclosure, other configurations are also applicable, as would be understood by persons having ordinary skill in the art.

Figure 1:
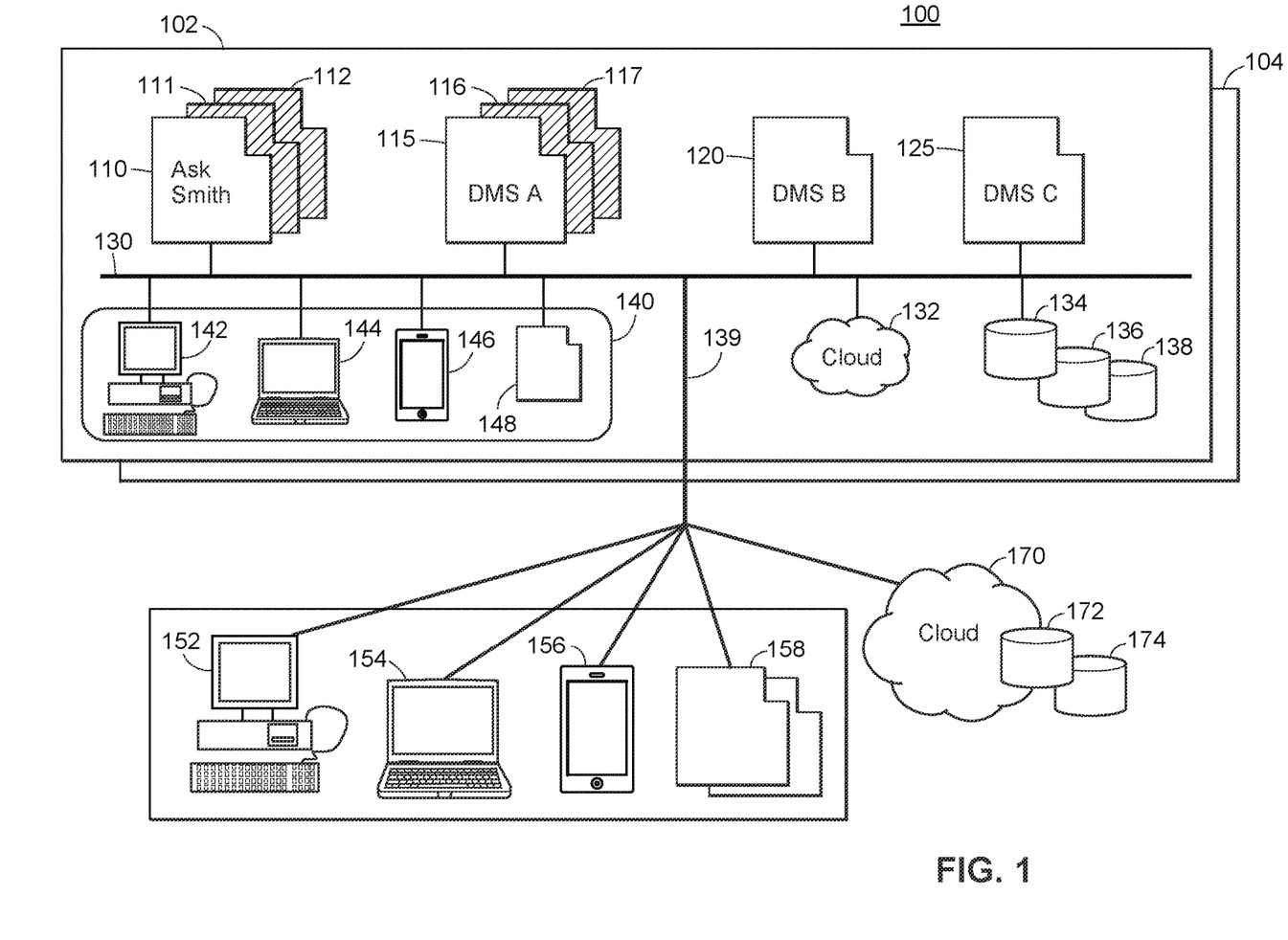
FIG. 1 illustrates a networked system overview of various systems and devices, including a document management system, in accordance with an aspect of the present disclosure.

FIG. 1 shows a networked computer system 102 including several document management systems 110-125 in communication via a computer network 130. The computer system 102 may be a private hosted computer system of company, including, for example, a company's intranet and related connected computers, devices, and other systems. The computer system 102 may also be a hosted computer system of a third party provider that provides and hosts the computer system 102 on behalf of other parties or companies. The computer system 102 may also be any other computer system that may perform the functionality as described herein.

The computer system 102 may also have backup or cloned computer systems, for example, backup system 104, which may be used as a failover computer network system in the event the main computer system 102 fails, slows down or otherwise is unable to continue normal operations, as further described herein. The backup system 104 includes all of the same systems and functionality of the computer system 102. The backup system 104 may also store the same data as computer system 102, in which the storage may be synchronized, where the data for backup system 104 is stored at the same time as for computer system 102. The backup system 104 may also store data in batch sessions, where the data from computer system 102 is backed-up to backup system 104 at particular times and over particular time periods, for example, where the data is backed-up every day at midnight. The backup system 104 may also be located at a remote geographical location, such as in another part of the same country or may be located internationally in different countries, to facilitate, for example, disaster recovery from a disaster event disabling or otherwise ceasing normal operations of computer system 102.

Computer system 102 may include one or more document management systems 110-125, where each document management system includes one or more processors, memory, storage, and networking equipment, as further described below for FIG. 2.

Each document management system may have one or more backup or clone systems which may be used as a failover system in the event the main system fails, slows down or otherwise is unable to continue normal operations, as further described herein. For example, document management system "Ask Smith" 110 is shown with two backup systems 111 and 112. The backup systems 112 and 114 are identical or substantially identical to system 110 and include all of the same functionality of document management system 110. Document management system DMS A 115 also has two backup systems 116 and 117, that have the same respective configuration and relationship with DMS 115. Although the document management systems 110 and 115 are shown with the two backup systems each, 112 and 114, and 116 and 117, respectively, more or fewer backup systems may be used for any DMS. This includes for document management systems 120 and 125, which are not shown with any backup systems, but may have one or many such systems in accordance with the disclosures herein.

Each of the document management systems and related backup systems are connected via computer network 130 that may be used to facilitate computer communication, using, for example, Ethernet, TCP/IP, or other computer protocols, among the document management systems 110-125. The document management systems 110-125 may also communicate over wireless communications, such as WiFi (not shown).

Although FIG. 1 shows four document management systems 110-125, any number of document management systems may be included in the computer system 102 and connected via computer network 130.

Document management systems 110-125 communicate via computer network 130 with other devices and systems. For example, document management systems 110-125 may store and retrieve documents, files, posts, or other data at remote databases 134, 136, and 138. In other aspects, the document management systems 110-125 themselves may store documents, files, posts, or other data, as further described for FIG. 2. The document management systems 110-125 may also communicate with cloud-based services 132, where such cloud-based services may include any of Software as a Service (SaaS) used for sending and receiving requests for processing documents, files or other information, or may include cloud-based storage services. In one aspect, such cloud-based services may be hosted on computer systems or hardware independent from the document management systems 110-125. In other aspects, the cloud-based services may be included as part of the document management systems 110-125 themselves. The document management systems 110-125 may access any of these storage devices or services at the request of any of the document management systems or other devices, such as the client devices, as shown in FIG. 1 and/or as further described herein.

The computer network 102 may also include client-based devices or systems that communicate with the document management systems 110-125 via the computer network. For example, FIG. 1 shows client devices 140, which includes personal computer 142, laptop computer 144, mobile device 146 (which may be a mobile phone or tablet computer, etc.), or any other device that has one or more processors 148 for communication on the computer network 130. The client devices may access the computer network 130 via Ethernet, WiFi or other various wired or wireless computer networking protocols. The client devices 140 may request and store documents, files, posts, and other data on the document management systems 110-125. For example, client device 144 may request a document for review and editing from document management system 115 and then store any changes or updates to the same, or other, document management systems 110-125. In another example, client device 114 may request a document management system 110 in the form of a webpage, where the document management system hosts a web application server for receiving requests for such documents and returns the document via the hypertext transfer protocol (HTTP) in the form of an online webpage. The online document may be a company webpage, such as a home screen. Other examples include company blogs, where the hosted webpage consists of user posts, comments, reactions, and other data related to blogging webpages or documents, as further described for FIG. 3.

The client devices 140 may be a company's devices used by employees or agents of the company on the company's intranet, for example, computer system 102, to create, store or retrieve documents from the document management systems 110-125 as described herein. In other aspects, the client devices 140 may be used to update, add information, or otherwise interact with the documents, files, posts, or other data on the document management systems. For example, a blog user using device 114 may submit a post on a blog and another user, using device 142, may react to the post by responding with a comment. All of the new information, including the new posting and comment data, are added to the respective document management system, for example, document management system 110, that hosts the blog. Other users, for example, using devices 146 or 148, can then review the blog posting and comments via updated webpages distributed by document management system 110.

Document or data retrieval from the document management systems 110-125 may also be performed by accessing an Application Programming Interface (API), where, for example, a client device 140 may request documents or data via the API on the communication network 130. The API may be based on any of remote procedure calls, Web Services, Representational State Transfer (RESTful) services, or another other HTTP or computer networking protocol. For example, a client device 140 may make a RESTful API request to document management system 110 for comment data related to a particular blog. Document management system 110 would then return the comment data in response, for example, comment data as described herein for FIGS. 3 and/or 5, where the comment data is returned formatted in the Extensible Markup Language (XML) or via JavaScript Object Notation (JSON). Other data types or formats may also be used. For webpages, document, or data retrieval may involve scraping, where the key data is scraped (filtered) from the display information of a webpage and returned to the requesting or scraping device, for example, a client device 140.

Remote client devices 150 may also communicate with the computer network 102 via a publicly accessible computer network 139, for example, the Internet. The remote client devices may have the same or more limited access to the documents, files, posts, or other data as described herein for client devices 140. For example, the remote client devices 150 may include devices used by employees of a company hosting computer system 102, where such employees login via a secure or encrypted network over computer network 139 and have the same access as for client devices 140. In another example, the remote client devices 150 may be customers of a company hosting computer system 102 and may have less access to the documents, files, posts, or other data than that described for employees using the client devices 140.

The document management systems 110-125 may also access and use remote software services or storage, for example, cloud-based services and storage 170, 172, and 174 via computer networks 130 and 139. Such cloud-based services and storage may include, for example, services and storage as described herein, but offered by third-party companies.

Figure 2:
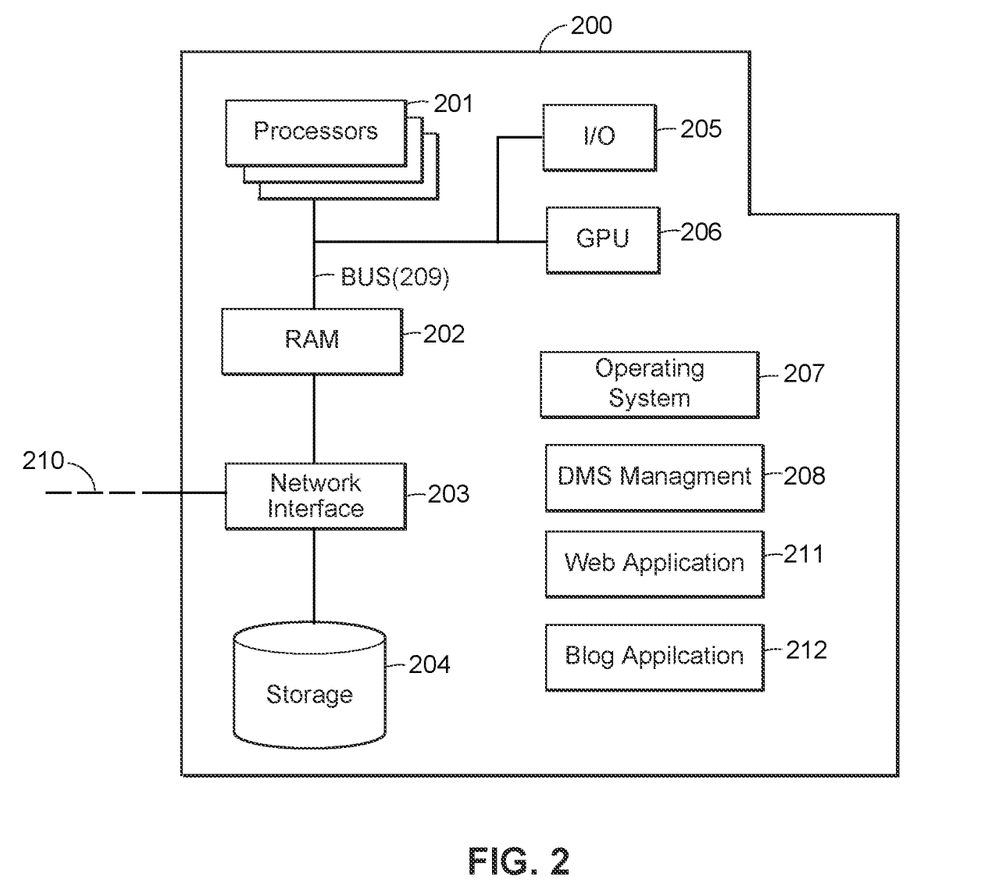
FIG. 2 illustrates an embodiment of a document management system of FIG. 1.

FIG. 2 illustrates an embodiment of a document management system 200, for example, document management system 110, of FIG. 1. In one aspect a document management system includes one or more processors 201, memory 202, for example, Random Access Memory (RAM), and one or more storage devices 204 for storing, retrieving or otherwise accessing the documents, files, posts, or other data as described herein. The document management system may further include a network interface 203, such as an Ethernet networking card or equipment, WiFi networking card or equipment, or other similar networking interface equipment for communicating on a computer network 210, for example, the Internet, or other computer networking channels, including those described above for FIG. 1, for example, computer networks 130 and/or 139.

The document management system 200 may also include an input/output (I/O) system 205 that can include, for example, a display screen, keyboard, mouse, touchscreen or any other user device allowing a user to interact with the document management system 200. The document management system 200 may also include a Graphical Processing Unit (GPU) that may be used to display the documents, files, posts, graphical representations, or other data, or other screened information or controls to the user of the system 200. A computer bus 209 may connect the processors(s), memory 202, network interface 203, storage device 204, I/O system 205 and GPU 206 and facilitate the flow of data and operation among these components. An operating system 207 may also be associated with the system 200, where the operating system is in communication with and controls the various system 200 components and allows a user, for example, to view, retrieve, store, use, or otherwise manage or manipulate the documents, files, posts, or other data, or methods or functionality of the document management system as described herein.

The document management system 200 may also be accessed remotely, such as through the Internet and the Network Interface 203, to allow a remote user of the system 200, for example, a user of a client device 150, to perform the same functionality.

Any number of document management software or other services may be installed on system 200 and may be used in facilitating the systems and methods as described herein. For example, the document management system 200 may include DMS management software 208 that performs the core tasks of storing, retrieving and otherwise facilitating document management of the system 200. Other examples include a web application 211 and blog application 212 software that run on or otherwise hosted by the system 200 to facilitate requests for webpages and/or blog posts and related data. For example, client devices 140 can request information from system 200 from a web browser such that the information is returned in the form of a webpage or blog page as described herein. The web application 211 and blog application 212 software may be part of or separate from the DMS Management software 208.

Figure 3:
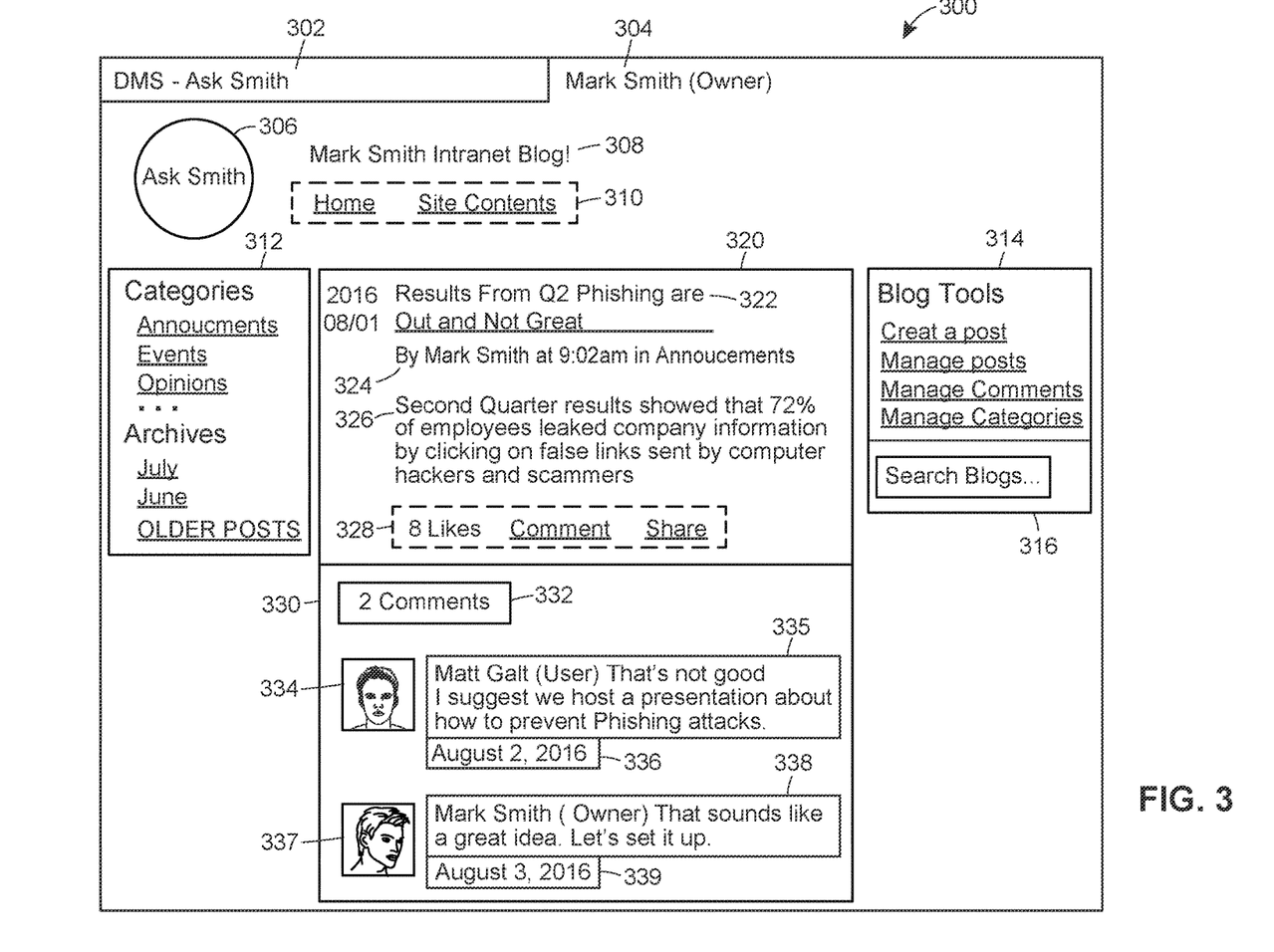
FIG. 3 illustrates an example of a blog post webpage of a document management system.

FIG. 3 illustrates an example of a blog post webpage of a document management system. Blog post webpage 300 may be stored in, retrieved and/or distributed by a document management system, for example, document management system 110. The blog post webpage 300 can either be a single document or comprised of separate documents, data or information that is used by the document management system to build an online document when requested. For example, blog post webpage 300 may be stored as data in any of the storage or database devices described herein, such as a relational database, and then used by the web application software on the document management system, as described herein, to generate a webpage for display to a requesting client device 140 using a web browser or other client program.

Blog post webpage 300 includes a DMS designation 302 indicating the document management system, in this case, document management system 110, that hosts the blog post webpage 300, and/or its related data or information. If a post is part of a blog exclusive to a particular user of the computer system 200, then the post may include a designation of the owner user. For example, blog post webpage 300 includes an owner designation 304, indicating that the user "Mark Smith" owns the particular blog to which blog post webpage 300 appears. Other users may log on to view posts by Mark Smith, including blog post webpage 300. Blog post webpage 300 may also include a graphic 306 unique to the Mark Smith blog and a title 308 for the blog, in this case, "Mark Smith's Intranet Blog!" The blog page may allow users to return to a home page associated with the Mark Smith blog by selecting the "Home" link in the links 310. Additionally, other users may review a Site Contents, which may include additional postings by Mark Smith, by selecting the Site Contents from links 310.

The blog webpage may include owner controls 314 that may be shown only to blog owners, such as Mark Smith, to allow the owner to create new postings, manage existing postings, manage comments, or manage blog categories. All newly added posts, data and other information are typically stored in the associated document management system, in this case system 110, but may also be stored in any of the other document management systems.

The blog webpage may also include search functionality 316, where users can search Mark Smith's postings via entering search string in the text box and submitting the request to the document management system. Users may also search the blog by selecting various category labels or searching through archives of older postings. For example, Category and Archive information 312 may be displayed on the blog where Categories, for example, "Announcements", "Events," and "Opinions" may be selected by the users.

Upon selection of the related links, only posts designated with the specific category are shown. Users may also browse archived, or older, postings by using the links associated with archived postings, for example, in blog post webpage 300, users may select the July, June or OLDER POSTS links to review options for archived postings.

The blog post webpage 300 may have one or more postings. For example, blog post webpage 300 shows a single posting 320. The posting may include a date, for example, posting 320 shows "Aug. 1, 2016," when the posting was posted and a title 322 for the posting. As shown by FIG. 3, the posting may include a title 322, for example, "Results from Q2 Phishing are Out and Not Great," and may include additional posting information 324 that includes that the posting was authored by Mark Smith and made at time 9:02 a.m., in the Announcements category. The posting 320 includes post text 326 authored by the author, in this case Mark Smith indicating that results from a second quarter phishing scams. Other users of the computer system 102 may react to the posting 320 via reaction links or buttons 328, which allow users, for example, to react by indicating that they "like" the posting 320, by sharing the posting 320 with other users by selecting the Share link, or by commenting on the posting 320 by selecting the Comment link.

Upon selection of the Comment link, users may respond or otherwise add to the posting 320 by authoring comments. Comments may be displayed along with the posting 320. For example, comments 330 are displayed underneath the posting 320. An indication of the number of comments 332 may also be display. A comment may include the comment author's associated image 334, 337 and/or the author's user name and text of the comment 335, 338, which may be displayed along with a date 336, 339 that the comment was posted. Comments may be used for a variety of purposes, for example, for a company as a way of communication, sharing information, or call for further action regarding a posting, for example, as is shown with respect to posting 320, where a suggestion or call to action is made.

Figure 4:
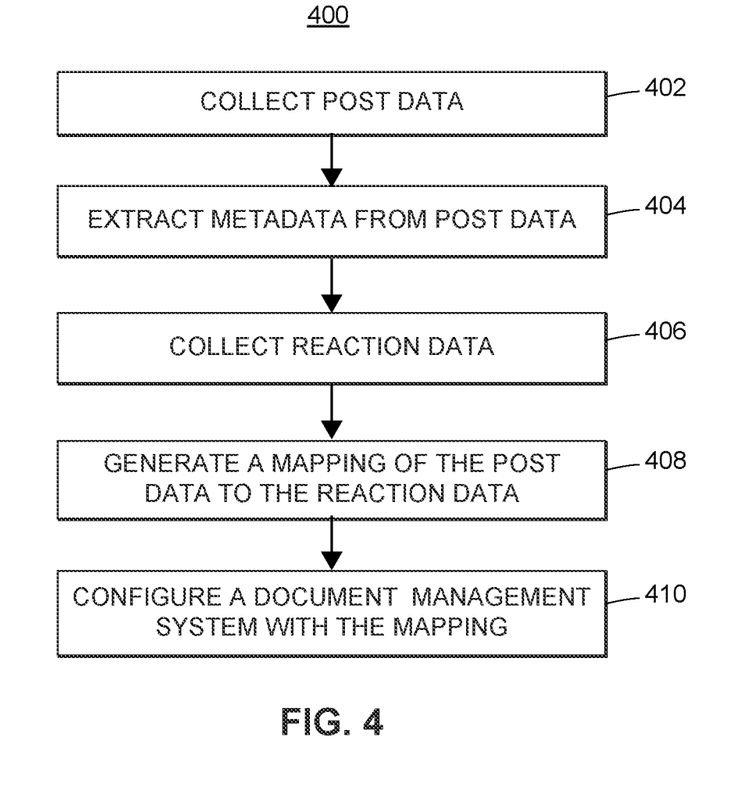
FIG. 4 illustrates a flow diagram of an exemplary method for improving a document management system with mapped post data.

FIG. 4 illustrates a flow diagram of an exemplary method for improving a document management system with mapped post data. Although the method described as being performed by a document management system, for example, laptop client device 144, the method may be performed by any of the computing devices described herein, including any of the document management systems 110-125, the client devices 140, the remote client devices 150, or any computing device with one or more processors. At block 402, post data is collected from one or more document management systems, for example, document management systems 110-125 of FIG. 1. The post data may be collected in a variety of ways, including via an API request or by scraping any of the webpages hosted by any of the document management systems, as described for FIG. 1. The post data can include any of the data, text, images, and related data or metadata, as described for FIG. 3, or other data as further described with FIGS. 5A and 5B.

At block 404 the document management system extracts data from the collected post data for use in generating a mapping, as described further herein. Block 404 includes extracting from the post data, metadata, including unique identifier(s) (ID) that identify the postings in the one or more documentation management systems, for example, any of 110-125. As described further herein for FIGS. 5A-5B, the IDs may be used to identify and reference individual postings, such as posting 320, in the document management system or systems. Other data, including data from various postings, for example, posting 320 or data as described for any of the tables shown or described for FIGS. 5A-5C may also be extracted and stored in memory of the document management system.

At block 406 the document management system collects reaction data from one or more of document management systems, for example, document management systems 110-125. The IDs from the extraction at block 404 are used to identify the related reaction data in the document management systems. The reaction data may be located on one or more document management systems, including the requesting document management system and/or different document management systems, including any of 110-125. The reaction data can include any the reactionary data or information, including comments, shares, likes, or similar reaction data or information that users provide for postings, as described herein for FIG. 3 and as further described for FIG. 5B. The reaction data may be collected via one or more APIs associated with the document management systems or by scraping webpages hosted by the document management systems as described herein.

At block 408, the document management system associates the related post data and reaction data, using the IDs from the previous blocks, for the generation of mapped data, which many include new generated information, including relationships and trends regarding, for example, the various postings, reactions or other data in the document management system(s). Such mapped data may include inferential or statistical mapping data, for example, regarding the relationships between node and edge data, visualized data, or other statistical, categorical or other data or information, each as described further herein, for example, for FIG. 5C. Certain mapped data may be generated, for example, by paring numerous postings, including hundreds or thousands of postings, across relationships determined from node and edge data, including user-to-user relationships, for example, how many times a first user reacted to a second user's post. For the same set of relationship pairings, statistical mapped data may also be generated, including, the reaction frequency, for example, the percentage of times the first user reacted to the second user's postings determined from the total reaction activity of the first user. Categorical mapped data may also be generated, for example, what categories of information do two users typically, or by percentage frequency, discuss or react to. Such categories can include "announcement" or "event" categories. Other categories can include "security," "new hire," "technology," "human resources," "business developments," advertisements," "public relations," "customers," or any other such categories that may be discussed or described by users in user postings, such as those described herein. Block 408 may also include generating several generations of mapped data where a first generation of mapped data is used to create a second generation of mapped data so forth.

At block 410, the document management system configures one or more document management systems, for example, any of the systems 110-125, with the mapped data. The mapped data may take on various forms, including, for example, the tabular data of FIG. 5C. For example, the data may be configured by creating or updating one or more tables in a database or databases associated with the document management systems, including any of the databases described for FIG. 1. This may include storing the table in any of the remote databases 134-138, cloud-based storage 170-174, or any other related storage device. The mapped data may also be configured with the one or more document management systems by associating stored files, such as comma separated values (CSV) files with the one or more document management systems, where, for example, the files would be able to be located or accessed by users of the system.

The mapped data may also be configured with the one or more document management systems by storing the mapped data in volatile or temporary memory, such as random access memory (RAM), of the document management systems where, in such cases, for example, the mapped data is used only once. Such temporary storage may be used when the generating block 408 is performed more than once to create additional generations of mapped data based on earlier generations. In such instances, the final generation of the mapped data may be configured with the one or more document management systems in permanent memory or storage, such as the databases or files described herein.

Once configured, the mapped data may be accessed by users of the document management system. For example, a human resources department may use the mapped data to determine participation and communication levels among various company employees and use the mapped data to encourage participation among low-level users, or to identify influential users and request that those influential users submit postings on behalf of the company. Other useful benefits include, for example, to identify areas of the system where additional information may be needed (e.g., the number of times a user has selecting a link from an email sent from an unknown user or user from outside the computer system 200), and, for example, to generate a survey to collect and store such information in the document management system; to identify a need further actions to take (e.g., need more employee training for phishing related email scams, as depicted for the posting of FIG. 3), or to generate a graphical representation or mapping of the interconnectedness of the documents, files or posting within the document management system to facilitate a visualization of the data for any of the above or other beneficial uses.

Figure 5A:
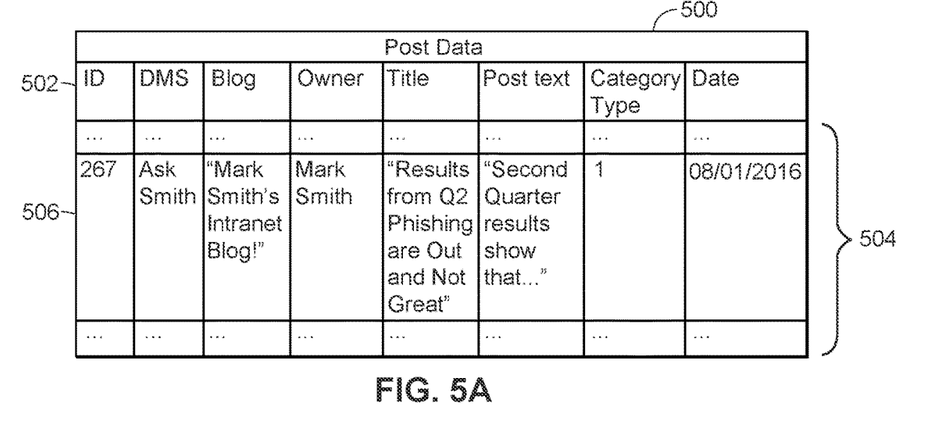
FIG. 5A illustrates an example tabular depiction of post data.

FIG. 5A illustrates an example tabular depiction of post data 500. The table 500, and other tabular data describe herein, may be included as, or part of, a table of a computer database, including a relational database, but other data formats and embodiments in accordance with the systems and methods described herein are also applicable. Table 500 may include a series of data categories or columns 502 that indicate the type of data stored in the table. Table 500 stores data related to user postings, for example, posting 320 of FIG. 3. Each posting is stored as row in the table, where a table may have one or more rows 504. For example, row 506 stores data related to the posting 320 of FIG. 3. Each posting has a unique identifier (ID) that identifies it in the table. For example, posting 320 is identified by ID 267. The ID may be used by a document management system, for example, system 110, to retrieve or otherwise manipulate the posting and its data. Table 500 shows additional data used by the posting 320, for example, DMS, Blog, Owner, Title, Post text, Category Type, and Date data, each as describe herein, but other columns and data may also be included in accordance with the disclosures herein. The data may be indicated by a surrogate value. For example, Category Type may include values 1 to 3, where each number is a surrogate for a particular category. For example, value 1 may indicate the related posting is in the "Announcement" category.

Figure 5B:
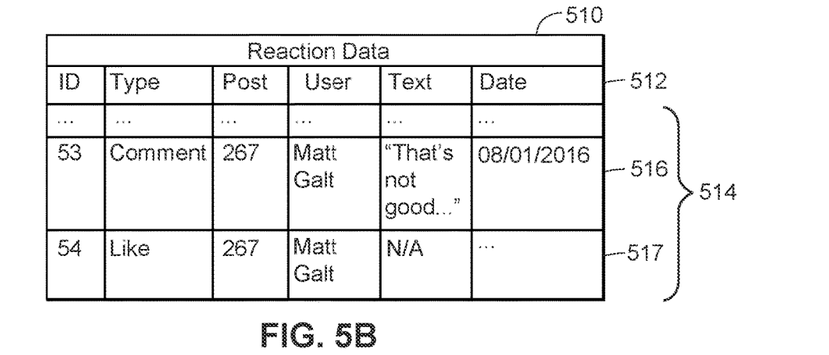
FIG. 5B illustrates an example tabular depiction of reaction data.

FIG. 5B illustrates an example tabular depiction of user reaction data 510. User reaction data 510 may include reactions to posts, such as likes, comments, shares or other reactions. For example, user reaction data may include the comments 330 shown in FIG. 3. Table 510 may include a series of data categories or columns 512 that indicate the type of data stored in the table. Table 510 stores data related to user reaction data, for example, reaction data related to posting 320 of FIG. 3. Each reaction data entry is stored as row in the table, where a table may have one or more rows 514. For example, row 516 and row 517 each store reaction data related to the posting 320 of FIG. 3. Each reaction data row has a unique identifier (ID) that identifies it in the table. For example, comment 335 of FIG. 3 is identified by ID 53. Row 517 indicates that a user, Matt Galt, reacted to the post 320 by clicking the Like link. The like reaction row 517 has its own ID 54. The IDs may be used by a document management system, for example, system 110, to retrieve or otherwise manipulate the reaction data. Table 510 shows additional data of the reaction data, for example, Type, Post, Text, and Date data, each as described herein, but other columns and data may also be included in accordance with the disclosures herein. The Post column indicates the post that the reaction data relates to. For example, the reaction data rows 516 and 517 with IDs 53 and 54, respectively, are related to the post with ID 267. The Type of posting is also indicated by table 510, where, for example, the reaction data row 516 with ID 53 relates to a comment, and the reaction data row 517 with ID 54 is related to a Like.

Figure 5C:
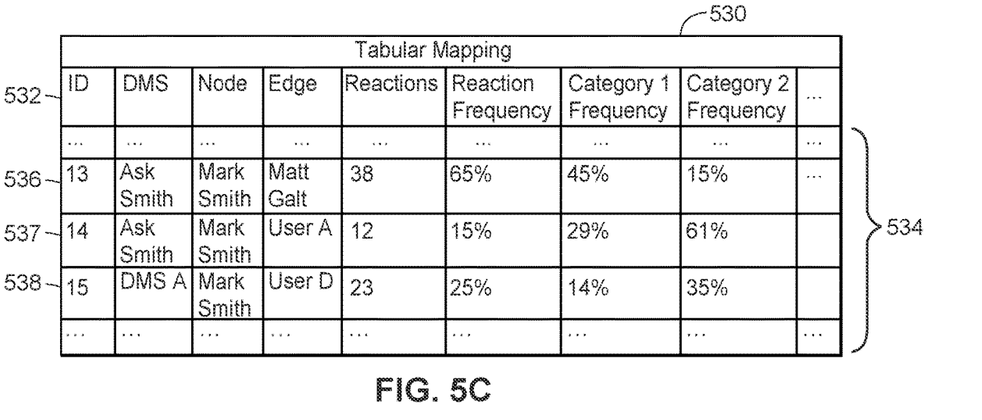
FIG. 5C illustrates an example tabular depiction of mapped post data.

FIG. 5C illustrates an example tabular depiction of mapped post data. Table 530 shows an embodiment of an improvement to a document management system, such as document management system 110, where the system 110 is configured with a generated mapping of data that can be further used by an owner, host or otherwise user of computer system 102, such as a company, for any of the benefits described herein. For example, and as described with respect to FIG. 4, mapped table 530 can be generated by the document management system and configured therewith. Table 530 may include a series of data categories or columns 532 that indicate the type of generated mapped data stored in the table. In one embodiment, table 530 comprises generated data related to post data, for example, data related to postings, such as posting 320 of FIG. 3. Each set of generated mapped data may be stored as row in the table, where a table may have one or more rows 534. Each generated mapped data row has a unique identifier (ID) that identifies it in the table. For example, row 536 is identified by ID 13. The document management systems 110-125 may retrieve, update or otherwise use the generated mapped data as described herein by referencing the row IDs.

For example, row 536 with ID 13 stores generated mapped data related to the posting 320 of FIG. 3. Each row may have any assortment of generated mapped data. For example, table 530 shows each row having DMS data indicating that the document management system that the mapped data relates to, where for row 536, the document management system 110 ("Ask Smith") is indicated. The mapped data may also include nodes. In one embodiment, a node may indicate an owner of a blog post webpage, such as Mark Smith for blog post webpage 300, as indicated for row 536. For each generated mapped data row, the node indicates a reference to which the other generated data values in the row relates or has a relationship with.

Other generated data for a given row, edge data, is data that indicates the relationship to the node. For row 536, the edge data indicates another user who has reacted to Mark Smith's postings, namely Matt Galt. In another aspect, the edge data may also indicate the type of reaction, for example, whether the reaction was a comment or like. Other data or information for the generated mapped data row may include data, such as inferential or statistical data mappings, regarding the relationship between the node and edge data for the row. For example, for row 536, the Reactions column indicates the number of reactions that Matt Galt has had to Mark Smith's postings. This could include, for example, overall reactions, or reactions for a given period of time, reactions with respect to a given blog webpage, or blog webpage category, etc. As another example, the generated mapped data row may include a reaction frequency, indicating how often Matt Galt reacts to Mark Smith's postings, for example, for row 536, 65% of the time. Other such information may include the types of categories that Matt Galt has reacted to with respect to Mark Smith's postings, for example, for row 536 Matt Galt reacting to Category 1, e.g., Announcements, 45% of the time, and Category 2, e.g., Events, 15% of the time.

Such generated mapped data, for example, the data of row 536 could be useful, for example, to a company or another party in determining how influential Mark Smith is with particular users, such as Matt Galt. Where considered together with other users, such as User A for row 527, it may be determined how influential Mark Smith on a broader base, such as company-wide. A company or other party may use such information to promote internal initiatives, or, where the data applies to public users, external advertisements for goods or services. For example, with respect to FIG. 3, Mark Smith made a posting titled "Results from Q2 are out and not great." Such posting could have been requested by Mark Smith's company using Mark Smith as a popular marketing channel where Mark Smith was deemed an influential user as determined from the mapped data in table 530.

Figure 6:
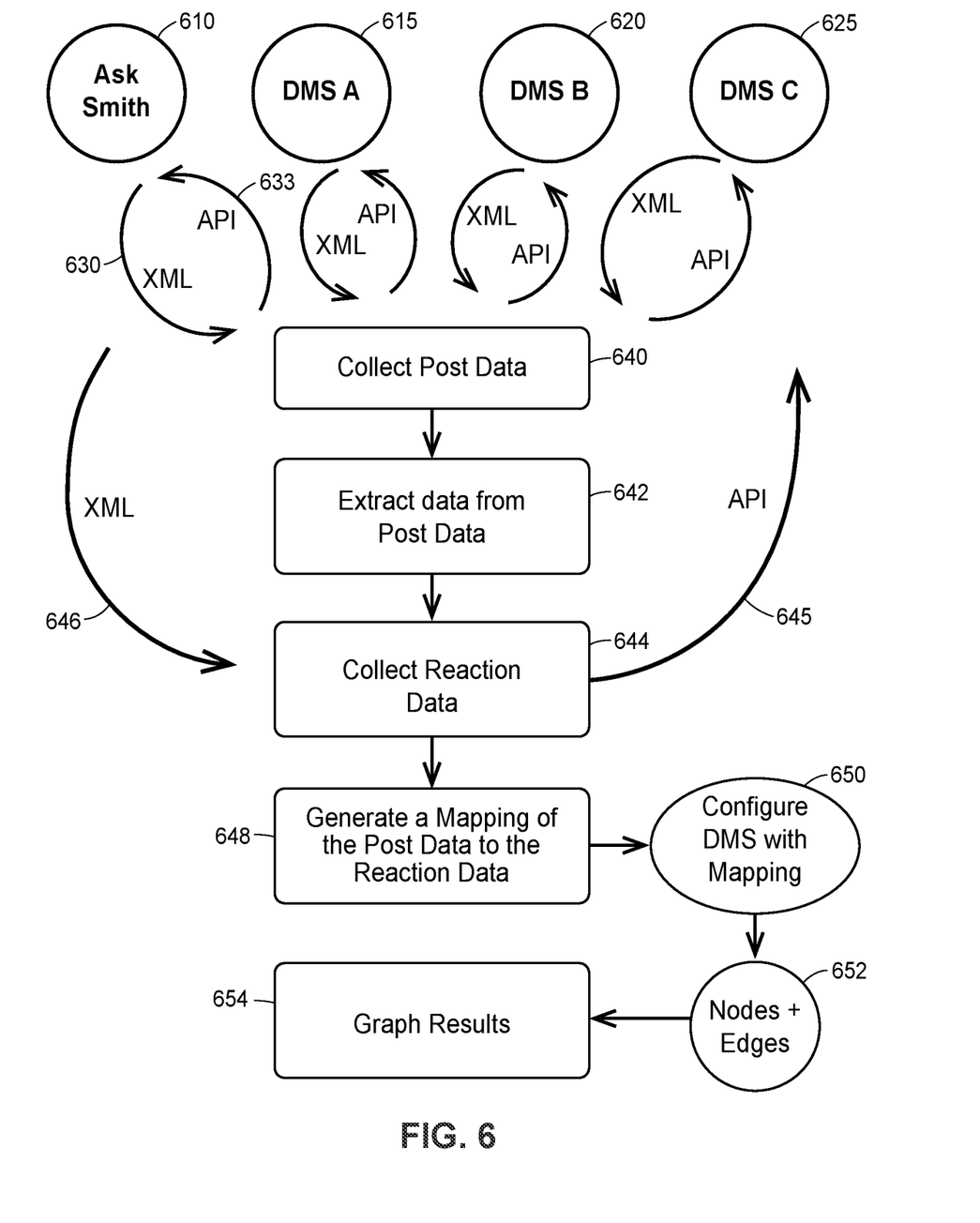
FIG. 6 illustrates a flow diagram of an exemplary method for visualizing mapped post data.
Figure 7:
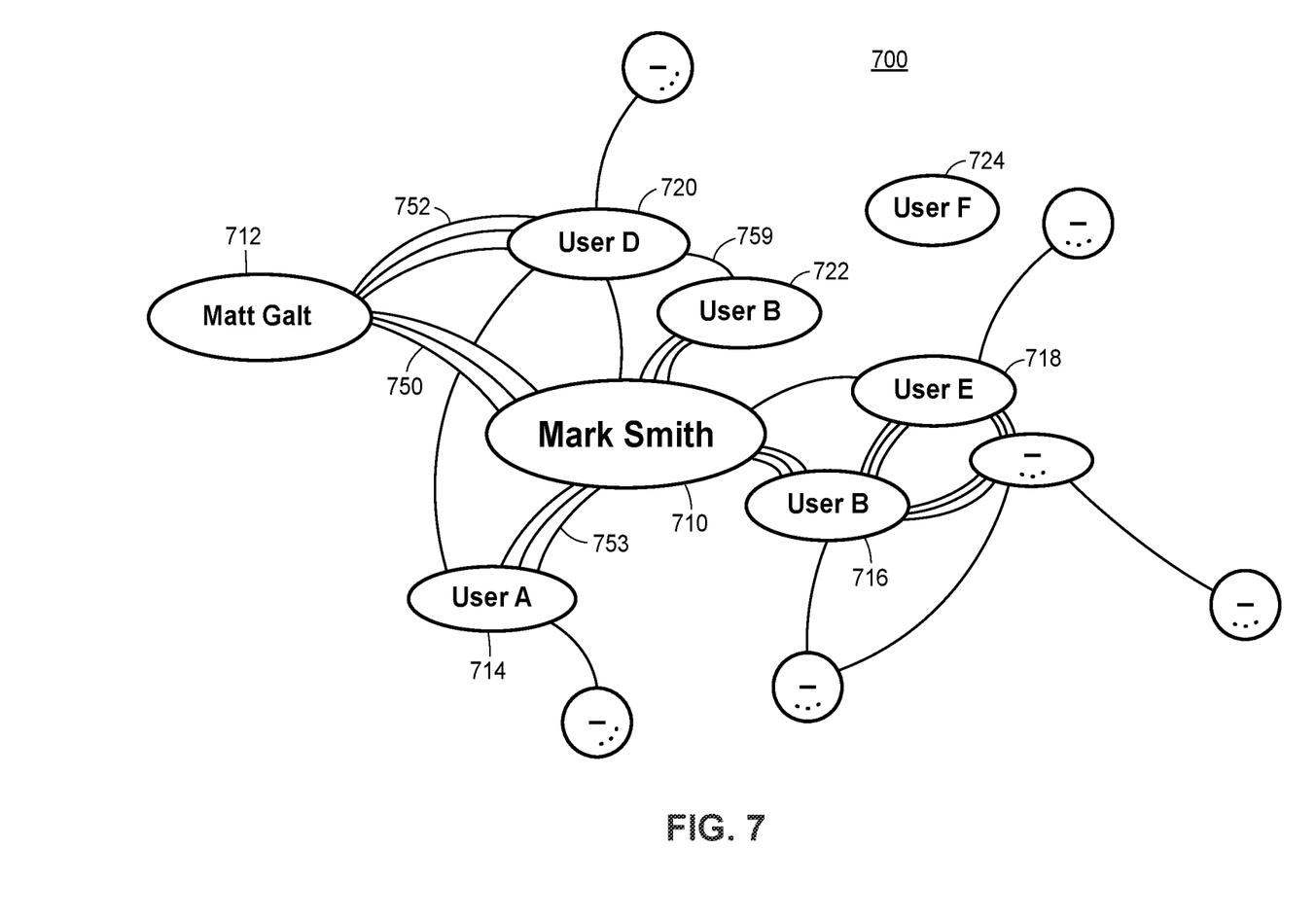
FIG. 7 illustrates an example graphical representation of the visualized mapped post data of FIG. 6.

The generated mapped data may also be used to build a visual representation, for example, as described for FIGS. 6 and 7 herein, that may be displayed and used by the computer system 102 users, such as the employees or management of a company.

Other generated mapped data rows, for example, 537 and 538, include other node and edge data similar to that described for row 536 and may be used accordingly as describe herein. For example, Mark Smith may be related to other users, such as User A, as shown by 537 and in a similar capacity as described for row 536. Matt Galt may be associated with other users, too, such as User D, as shown for row 538, and where Matt Galt is associated with a different document management system DMS A.

In this way, an enhanced mapping (e.g., table 530) can be generated that improves the functionality of the document management system or systems by using available data to generate new data that describes, categorizes or otherwise organizes the interrelatedness of the data on the document management systems. Such mapping data can be generated and configured with the document management systems at one time. In other aspects, the mapping may be generated as part of a batch process, where the document management system or systems generate the mapping at a particular time over a particular time period, such as every day at midnight, and then configures the document management system accordingly over time.

FIG. 6 illustrates a flow diagram of an exemplary method 600 for visualizing mapped post data. FIG. 6 and its related disclosure represents an embodiment of systems and methods described herein, where a visualization of the mapped data is further generated for configuration with a document management system. FIG. 6 corresponds to method 400 of FIG. 4, and therefore the related disclosure for method 400 and FIG. 4 are incorporate by reference herein. At block 640, a computing device, for example, laptop client device 144 of FIG. 1, collects post data from multiple document management systems 610, 615, 620 and 625. The document management systems 610-625 may be, for example, the document management systems 110-125 of FIG. 1, with all of their related functionality and connected devices and systems as described herein. At block 640, the computing collects post data by making requests to each of the document management system's respective API. For example, an API request 632 is made to the Ask Smith document management system 610. The document management system responds with post data, in the form of an XML response 630 for this embodiment, for receipt by the client device 144. The client device makes similar API requests to and receives similar XML responses from the other document management systems DMS A 615, DMS B 620 and DMS C 625.

At block 642 the client device extracts the data and metadata from the post data as described for block 404 for method 400.

At block 644 the client device collects the reaction data from the document management systems as described for block 406 for method 400. For example, with respect to method 600, the client device makes an API call 645 to each of the document management systems 610-625 using the IDs extracted from the collected post data at blocks 640 and 642. The client device then receives, as a result of the API call, an XML response with reaction data 646 from each of the document management systems 610-625.

At blocks 648 and 650, the mapped data is generated from the post data and reaction data and then configured with one or more of the document management systems, as described herein for blocks 408 and 410 of method 400, respectively.

At block 652, nodes and edge data is extracted from the mapped data where, at block 654, the computing device generates a visualization of the data. As further described for FIG. 7, the visualization can be a graphical mapping of the nodes and edges, where for example, with respect to the user postings, a node can be a user of the system. An edge can be a graphical representation showing a relationship between two users, or two nodes, in the system. The graphical representation can be used, for example, by users of the document management system to visualize important and beneficial relationships and issues as described herein, for example, identifying influential users, or, in the alternative, users who make little contributions, to further communications within a company or among a company's customers.

FIG. 7 illustrates an example graphical representation 700 of the visualized mapped post data of FIG. 6. Node 710 shows a user, Mark Smith, who owns the blog titled "Ask Smith" hosted on the Ask Smith document management system 110 and 160 as shown and described for FIGS. 1, 3, and 6, respectively. The graphical representation may show a user with a node size proportional to the amount of reactions and/or the amount of posts that the user submitted with respect to other users. For example, Mark Smith is shown with a large node size because of the large number of reactions and/or posts Mark Smith made with respect to other users, such as Matt Galt at node 712.

User reactions and relationships are depicted in FIG. 7 by edges from one node, or user, to the other. As shown, user Mark Smith at node 710 has more than one reaction or relationship with user Matt Galt at node 712 as shown by edges 750. As depicted, the graphical representation of FIG. 7 shows that each of Mark Smith and Matt Galt have further edges with other users of the document management system, for example, Matt Galt has two or more edges with User D at node 720, indicating that a "strong" or influential relationship between those two users. User D has a further relationship with User E, at node 722, but with only a single edge 754, the relationship between User D and User E is not considered influential. Mark Smith at node 710, on the other hand, has an influential relationship with User E because of the several edges between Mark Smith and user E. Mark smith also has several other influential relationships with other users of the document management system, including User A at node 714 and User B at node 716, but not with User E at 718. Influential users may be used, for example, by a company to push important communications or advertisements to other employees or customers of the company.

User F at node 724 is identified as having no relationships or as having made no reactions with respect to any other user in the document management system because user F has no edges depicted. Such users may be identified, for example, for selection to receive correspondence encouraging such users to facilitate communication by, for example, participating in the document management system's blog postings or to create their own blogs or postings, or to react to other user postings.

The graphical representation 700 may also be interactive. For example, graphical representation may be layered, where a user viewing the representation 700 on a computing device may obtain more detailed information by zooming in on a particular node or nodes. The zoomed in version of the representation 700 may show additional information, such as additional nodes and relationships that were not as strong (e.g., didn't have as many edges) to be shown in the original non-zoomed representation. For example, zooming in on node 710 for Mark Smith may show further users with relationships with Mark Smith, but with fewer edges because such further users only reacted to Mark Smith once. In another example, such users may have reacted to Mark Smith a long time ago, in which older reacting users and nodes are not shown in the original representation, but only in the further zoomed in version. In a similar manner, zooming out of the graphical representation 700 may filter weaker nodes and edges such that only influential users are shown. Such graphical manipulation can provide a user of the document management systems with a quick and facile way to effectively view, filter, or otherwise determine influential or weak relationships among the many different possible permutations and combinations of relationships that may develop among the users of document management systems so as to take advantage of the benefits described herein.

Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer system for generating a graphical representation of a mapping of post data of a posting, the computer system comprising one or more processors and a memory configured to store instructions, the instructions executed by the one or more processors to cause the computer system to:
collect the post data from one or more document management systems, the post data including a first node of a plurality of nodes identifying a submitting user of the one or more document management systems that submitted the posting to the one or more document management systems;
collect reaction data from the one or more document management systems, wherein the reaction data is associated with the posting and the reaction data further including a second node of the plurality of nodes identifying a reacting user of the one or more document management systems that reacted to the posting;
periodically generate the mapping of the post data to the reaction data, wherein the mapping includes the first node of the plurality of nodes and the second node of the plurality of nodes; and
generate the graphical representation of the mapping, wherein zooming out of the graphical representation filters out one or more nodes of the plurality of nodes based on a number of edges corresponding to the one or more nodes, and wherein the one or more nodes reappear on the graphical representation in response to zooming in on the graphical representation.

2. The computer system of claim 1, wherein the mapping further includes a third node of the plurality of nodes associated with an influential user of the one or more document management systems, the influential user having two or more edges, and wherein at least one of the one or more document management systems pushes a communication of the influential user to other users associated with a company.

3. The computer system of claim 1 further configured to generate an electronic survey, the electronic survey sent to one or more users of the one or more document management systems, wherein the electronic survey requests data from the one or more users.

4. The computer system of claim 1, wherein the reacting user reacted to the posting by submitting a comment to the posting.

5. The computer system of claim 1, wherein one or more nodes of the plurality of nodes of the graphical representation of the mapping have a node size based on a number of edges corresponding to the one or more nodes.

6. The computer system of claim 1, wherein the one or more document management systems store the mapping in a remote database.

7. The computer system of claim 1, wherein the mapping identifies one or more categories associated with the post data.

8. A computer-implemented method for generating a graphical representation of a mapping of post data of a posting using one or more processors, the method comprising:
collecting the post data from one or more document management systems, the post data including a first node of a plurality of nodes identifying a submitting user of the one or more document management systems that submitted the posting to the one or more document management systems;
collecting reaction data from the one or more document management systems, wherein the reaction data is associated with the posting and the reaction data further including a second node of the plurality of nodes identifying a reacting user of the one or more document management systems that reacted to the posting;
periodically generating the mapping of the post data to the reaction data, wherein the mapping includes the first node of the plurality of nodes and the second node of the plurality of nodes; and
generating the graphical representation of the mapping, wherein zooming out of the graphical representation filters out one or more nodes of the plurality of nodes based on a number of edges corresponding to the one or more nodes, and wherein the one or more nodes reappear on the graphical representation in response to zooming in on the graphical representation.

9. The computer-implemented method of claim 8, wherein the mapping further includes a third node of the plurality of nodes associated with an influential user of the one or more document management systems, the influential user having two or more edges, and wherein at least one of the one or more document management systems pushes a communication of the influential user to other users associated with a company.

10. The computer-implemented method of claim 8 further comprising generating an electronic survey, the electronic survey sent to one or more users of the one or more document management systems, wherein the electronic survey requests data from the one or more users.

11. The computer-implemented method of claim 8, wherein the reacting user reacted to the posting by submitting a comment to the posting.

12. The computer-implemented method of claim 8, wherein one or more nodes of the plurality of nodes of the graphical representation of the mapping have a node size based on a number of edges corresponding to the one or more nodes.

13. The computer-implemented method of claim 8, wherein the one or more document management systems store the mapping in a remote database.

14. The computer-implemented method of claim 8, wherein the mapping identifies one or more categories associated with the post data.

15. A tangible, non-transitory computer-readable medium storing instructions for generating a graphical representation of a mapping of post data of a posting , that, when executed by one or more processors of a computer system, cause the computer system to:
collect the post data from one or more document management systems, the post data including a first node of a plurality of nodes identifying a submitting user of the one or more document management systems that submitted the posting to the one or more document management systems;
collect reaction data from the one or more document management systems, wherein the reaction data is associated with the posting and the reaction data further including a second node of the plurality of nodes identifying a reacting user of the one or more document management systems that reacted to the posting;

periodically generate the mapping of the post data to the reaction data, wherein the mapping includes the first node of the plurality of nodes and the second node of the plurality of nodes; and generate the graphical representation of the mapping, wherein zooming out of the graphical representation filters out one or more nodes of the plurality of nodes based on a number of edges corresponding to the one or more nodes, and wherein the one or more nodes reappear on the graphical representation in response to zooming in on the graphical representation.

16. The tangible, non-transitory computer-readable medium of claim 15, wherein the mapping further includes a third node of the plurality of nodes associated with an influential user of the one or more document management systems, the influential user having two or more edges, and wherein at least one of the one or more document management systems pushes a communication of the influential user to other users associated with a company.

17. The tangible, non-transitory computer-readable medium of claim 15, further configured to cause the computer system to generate an electronic survey, the electronic survey sent to one or more users of the one or more document management systems, wherein the electronic survey requests data from the one or more users.

18. The tangible, non-transitory computer-readable medium of claim 15, wherein one or more nodes of the plurality of nodes of the graphical representation of the mapping have a node size based on a number of edges corresponding to the one or more nodes.

19. The tangible, non-transitory computer-readable medium of claim 15, wherein the reacting user reacted to the posting by submitting a comment to the posting.

20. The tangible, non-transitory computer-readable medium of claim 15, wherein the one or more document management systems store the mapping in a remote database.

* * * * *